(12) United States Patent
Paillard et al.

(10) Patent No.: US 8,679,342 B2
(45) Date of Patent: Mar. 25, 2014

(54) METHOD OF TREATING WATER EFFLUENT FROM PURGING OR CLEANING STEAM GENERATOR CIRCUITS, AND A MOBILE UNIT ENABLING THE METHOD TO BE IMPLEMENTED

(75) Inventors: Hervé Paillard, Vernon (FR); Jérôme De Benedittis, Villeurbanne (FR); Joseph Bonnefoy, Montmeyran (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 521 days.

(21) Appl. No.: 12/424,225

(22) Filed: Apr. 15, 2009

(65) Prior Publication Data

US 2009/0261039 A1 Oct. 22, 2009

(51) Int. Cl.
*B01D 15/04* (2006.01)
*B01D 61/00* (2006.01)

(52) U.S. Cl.
USPC ...... 210/638; 210/749; 210/768; 210/500.21; 210/652

(58) Field of Classification Search
None
See application file for complete search history.

(56) References Cited

U.S. PATENT DOCUMENTS

| | | | |
|---|---|---|---|
| 4,105,556 A * | 8/1978 | O'Amaddio et al. | 210/206 |
| 4,983,302 A | 1/1991 | Balint et al. | |
| 7,067,057 B2 * | 6/2006 | Rosenberger et al. | 210/195.2 |
| 2005/0211632 A1 | 9/2005 | Hung et al. | |
| 2006/0201882 A1 | 9/2006 | Chen et al. | |

FOREIGN PATENT DOCUMENTS

| | | |
|---|---|---|
| DE | 19901571 | 7/2000 |
| EP | 1734013 | 12/2006 |
| WO | 2004099087 | 11/2004 |
| WO | 2005009908 | 3/2005 |

* cited by examiner

*Primary Examiner* — Krishnan S Menon
*Assistant Examiner* — Allison Fitzsimmons
(74) *Attorney, Agent, or Firm* — Coats and Bennett PLLC (57) ABSTRACT

The invention relates to a method of treating water effluent from purging or cleaning steam generator circuits.
In characteristic manner, the following steps are performed:
  filtering the raw effluent to separate insoluble matter from the filtered effluent; and
  concentrating the filtered effluent to below the solubility limit of the dissolved species so as to obtain a liquid concentrate, the concentration step including at least evapo-concentration treatment and reverse osmosis treatment;
  the pH of the effluent being adjusted to a value in the range 5 to 6.5.

9 Claims, 11 Drawing Sheets

METHOD OF TREATING WATER EFFLUENT FROM PURGING OR CLEANING STEAM GENERATOR CIRCUITS, AND A MOBILE UNIT ENABLING THE METHOD TO BE IMPLEMENTED

FIELD OF THE INVENTION

The invention relates to a method of treating water effluent produced by steam generators and the associated steam circuits. The invention also relates to a mobile unit enabling the method of treating water effluent to be implemented.

By way of non-limiting example, the circuits may be secondary circuits in a nuclear power station, or primary circuits in a fossil fuel power station, or indeed steam circuits fitted to any other type of industrial unit.

BACKGROUND OF THE INVENTION

More precisely, the invention relates to treating water effluent from purging or from chemical cleaning, i.e. respectively effluent at low concentration generated continuously for maintenance and preventative cleaning of steam circuits, or else effluent that is more concentrated, resulting from maintenance operations that take place regularly but at intervals, or indeed effluent that is even more concentrated as is generated when performing more thorough cleaning as is done exceptionally.

During these operations, the water is treated with various chemicals at different concentrations to perform so-called conditioning treatment on the water that is fed to steam generators: the chemical treatment to which the water is subjected gives it characteristics that are desired as a function of the installation in use.

In this way, implementing water conditioning treatment serves to protect the installation against scale, corrosion, or carry-over deposition, and in particular to protect steam transfer pipes and condensate return pipes, and also to protect heat exchangers. "Carry-over" is the term designating the phenomenon of water being entrained by steam.

During such conditioning treatment, use is made in particular of the following families of chemicals:
  alkalinizers for increasing the pH of water and neutralizing dissolved $CO_2$ by decomposition into carbonates and bicarbonates, thereby reducing the risk of corrosion: these alkalinizers may be organic and/or inorganic, being based in particular on amines such as morpholine, ammonia, caustic soda NaOH, or indeed phosphates such as orthophosphates, trisodium phosphate $Na_3PO_4$, ammonium phosphate $(NH_4)_3PO_4$;
  dispersing-complexing agents (or anti-scale agents) serving to avoid salts precipitating and to fix metals that come from metal oxide layers in pipes: these agents may be acids and salts of carboxylic or poly-carboxylic acids, in particular EDTA (ethylene diamine tetracetic acid), NTA (nitrilotriacetic acid), acrylic and methacrylic polymers, phosphonates;
  corrosion inhibitors in the form of reducing agents to reduce the oxides of formed metals and dissolved oxygen: in particular hydrazine $N_2H_4$, sulfite, tanins, volatile amines, and film-forming amines; and
  anti-carry-over chemicals: polyamides, polyethylene, and propylene glycols, . . . .

It should be observed that to begin with the water is demineralized by a softening treatment (on ion exchange resin or on membranes (via reverse osmosis)) in order to provide water with a low concentration of mineral salts, in particular alkaline-earth salts. Thus, the water used in steam generators presents a low concentration in particular of calcium and magnesium ions, which also applies to effluent from such installations.

As a consequence of the above, effluent contains conditioning and/or cleaning chemicals (morpholine, hydrazine, amines, EDTA, . . . ) together with by-products of the water treatment and of cleaning (metals such as ion and copper, ammonia, . . . ).

As a result, such effluent cannot be released into the surrounding environment or indeed into residential or industrial waterworks without prior purification treatment since the concentration of chemicals in the effluent exceeds standards for acceptable release, or exceeds toxicity thresholds when biological purification treatments are used.

The water effluent produced by steam generators and the associated thermal circuits have three main origins:
  Boiler purges that consist in continuous or discontinuous but regular production of effluent containing all of the conditioning chemicals at low concentration. This effluent is either delivered to the on-site purification system (physicochemical and/or biological treatment) if one exists, or else it is stored and taken to a destruction center. The effluent is treated by evapo-incineration or by direct incineration.
  Condensates that are treated on site and recycled to the boiler. Since condensates have low concentrations of conditioning chemicals (in general only a few parts per million (ppm)), condensates are treated on site, continuously, generally involving filtering to eliminate material in suspension (metal oxides) and free oils, and treatment by one or two ion exchange resin stages to eliminate salts (coming from the conditioning chemicals) that run the risk of becoming concentrated. The effluent from the condensate treatment and recycling unit is delivered to the on-site purification system (physicochemical and/or biological treatment) if there is one, or else it is stored and taken to a destruction center.
  Chemical cleaning effluent that consists in production that is periodic with a high concentration of conditioning chemicals suitable for performing remedial cleaning. This effluent is stored and then taken to a destruction center.

It can thus be understood that as a general rule, the effluent is stored and transported to a destruction center, which requires large volumes of effluent to be managed, thereby giving rise to significant costs, in particular as a result of transporting such large volumes.

OBJECT AND SUMMARY OF THE INVENTION

An object of the present invention is to provide a method of treating water effluent from purging or cleaning steam generator circuits, which method enables the drawbacks of the prior art to be overcome, and in particular makes it possible to treat the effluent on site by concentrating it very strongly, such that transport to a destruction center might be required, but only for the concentrate.

To this end, according to the present invention, the method comprises performing the following steps:
  filtering the raw effluent to separate insoluble matter from the filtered effluent; and
  concentrating the filtered effluent to below the solubility limit of the dissolved species so as to obtain a liquid concentrate, the concentration step including at least evapo-concentration treatment and reverse osmosis treatment;

the pH of the effluent being adjusted to a value in the range 5 to 6.5.

In this way, it is possible to obtain a liquid concentrate that is genuinely concentrated with pollutants, and preferably very concentrated with pollutants (several tens to several hundreds of grams per liter (g/L)), the dissolved species then being close to their solubility limit in the liquid concentrate, which approximates to a liquor or a syrup of salts of conditioning chemicals.

Thus, the method of the invention makes it possible to treat effluent that is very concentrated in metals, in nitrogen compounds, and in organic acids at concentrations of several g/L, and to produce treated effluent that complies with standards for release into the environment (less than a few milligrams per liter (mg/L)).

This solution also presents the additional advantage of enabling the volume of effluent that needs to be transported to a specialized elimination center to be reduced by a factor of 5 to 30, thereby giving rise to a major reduction in transport and destruction costs.

Overall, by virtue of the solution of the present invention, it is possible in fairly simple manner to concentrate significantly the water effluent produced by steam generators and the associated steam circuits, even if they contain a high concentration of residues of conditioning chemicals and other undesirable chemical compounds such as metals or metal oxides.

Firstly, the water effluent produced by steam generators and the associated thermal circuits are filtered to eliminate insoluble matter such as free oils, colloids, and matter in suspension (metal oxides). This constitutes safety pre-filtering for the purpose of protecting the downstream treatment steps from clogging.

This water effluent generally presents pH at values that are somewhat basic. In the invention, a second step is performed of adjusting pH to a value lying in the range 5 to 6.5. This disposition serves advantageously, at the end of the concentration step, to achieve high efficiencies in eliminating soluble chemical compounds, and in particular morpholine and nitrogen compounds such as ammonia and amines, and also hydrazine, metal complexing agents such as EDTA, and metals (in particular iron and copper).

This value range is the result of a compromise.

In the present invention, the pH of the medium is adjusted to values that are acidic or close to being neutral, but never less than 4.5 so as to avoid any precipitation of organic acids, since that would clog the treatment equipment (osmosis membranes and heat exchanger when performing evapo-concentration).

In addition, eliminating organic acids from the effluent under consideration by osmosis and by evapo-concentration is more effective when the pH of the medium is high so that such molecules are entirely in their ionized form. For other organic compounds that are present, essentially constituted by basic nitrogen compounds and ammonia, the lower the pH the greater the effectiveness of the reverse osmosis and evapo-concentration processes, since the lower the pH the greater the extent to which these molecules are ionized. In practice, in order to reduce nitrogen compounds significantly by osmosis or by evapo-concentration, it is necessary to keep the pH of the medium to below 7.5.

Thus, in the invention, the pH of the medium is maintained in the range 5 to 6.5 so that reverse osmosis and evapo-concentration simultaneously eliminate compounds having an organic acid function and organic compounds having a nitrogen function, together with ammonia.

Preferably, the pH of the effluent is adjusted to a value greater than or equal to 5.2, preferably greater than or equal to 5.4, and advantageously to a value greater than or equal to 5.5.

In another preferred provision of the invention, making it possible to achieve high concentration in spite of high rates of pollutants such as morpholine, ammonia, amines, and metals in the effluent, during the concentration step, at least the two treatments comprising evapo-concentration and reverse osmosis are performed, possibly together with treatment by ion exchange resin.

In addition, one or more of the following provisions are preferably adopted:
  the pH of the effluent is adjusted upstream from the reverse osmosis treatment;
  the pH is adjusted upstream from the evapo-concentration treatment;
  the pH is adjusted upstream from the filtering step;
  the concentration step includes the evapo-concentration and reverse osmosis treatments, and preferably the evapo-concentration treatment is performed on the osmosis concentrate or the reverse osmosis treatment is performed on the evapo-concentration distillate;
  the concentration step further comprises ion exchange resin treatment on the permeate of the reverse osmosis treatment;
  the reverse osmosis treatment is performed in a single stage;
  the reverse osmosis treatment is performed in two stages, with the second reverse osmosis stage being fed with the permeate from the first stage; and
  the reverse osmosis treatment is performed in two stages and the pH of the effluent is adjusted between the two reverse osmosis stages.

According to another aspect of the present invention, a mobile unit is provided for treating water effluent from purging or cleaning steam generator circuits, the unit being specially adapted to implement the above-described method.

To this end, the mobile unit comprises:
  an inlet duct suitable for being connected to a vessel containing the effluent;
  a filter module suitable for separating insoluble matter from the filtered effluent;
  an evapo-concentration treatment module having an inlet, a distillate outlet, and a concentrate outlet;
  a reverse osmosis treatment module having an inlet, a permeate outlet, and a concentrate outlet;
  a pH adjustment module having an inlet and an outlet;
  at least one outlet duct for delivering treated effluent; and
  pipes interconnecting the inlet ducts, the outlet ducts, and the inlets and outlets of the various modules, and valves enabling said pipes to be opened and closed.

Preferably, the mobile unit further includes a module for treatment by ion exchange resin, the module having an inlet for regeneration solution, an inlet for liquid to be treated, and an outlet for eluate, and an outlet for filtrate.

Thus, by means of such a mobile unit, it is possible to implement the method of the invention for treating water effluent from purging or cleaning steam generator circuits in various configurations, making it possible to optimize the treatment that is implemented depending on the type of the pollutants and their concentrations. Furthermore, it is possible to transport the treatment machine from site to site, either so as to bring it close to the steam generators that produce the effluent for treatment, or else to take it to a specialized treatment site to which the effluent for treatment is transported.

BRIEF DESCRIPTION OF THE DRAWINGS

Other advantages and characteristics of the invention appear on reading the following description made by way of example and with reference to the accompanying drawings, in which.

MORE DETAILED DESCRIPTION

Figure 1:
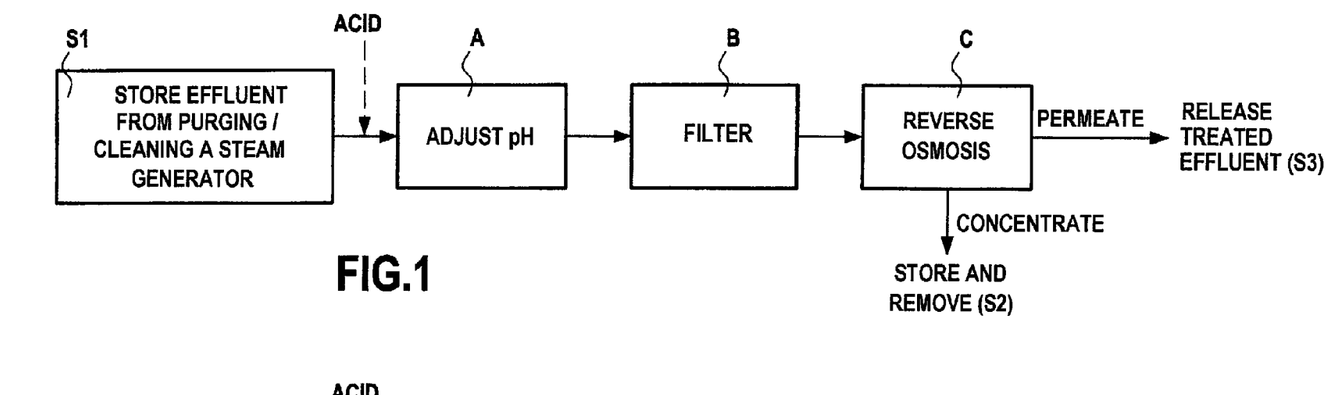
FIG. 1 shows a first treatment procedure in a first embodiment that does not implement the method of the invention.

In a first embodiment, there is proposed a first treatment procedure as shown in FIG. 1 that comprises a vessel S1 for storing water effluent from purging or cleaning steam generator circuits. From the vessel S1, the effluent is subjected to a step of adjusting its pH to a value lying in the range 5 to 6.5 (module A), and then a filtering step (module B), and finally to a concentration step making use of reverse osmosis treatment (module C). At the end of the reverse osmosis treatment, the concentrate is stored in a vessel S2 prior to being removed and taken to a destruction center, while the permeate, at low concentration, can be released (waste pipe or vessel S3).

In this first procedure, only one stage of reverse osmosis is provided and it constitutes the only treatment in the concentration step of the treatment method.

This relatively simple configuration is suitable in particular for treating effluent from chemically cleaning a steam generator, which effluent carries a small to moderate load of nitrogen compounds (see Example 1 below) or to treating effluent from chemically cleaning a steam generator, which effluent carries a moderate load of nitrogen compounds and metals (see Example 2 below).

Example 1

Application of Reverse Osmosis to Treating Effluent from Chemically Cleaning a Steam Generator, which Effluent Carries a Moderate Load of Nitrogen Compounds The conditions for this test were as follows:
filtering pre-treatment with a cutoff threshold of 10 micrometers (µm); and
adjust pH to 6.3 prior to reverse osmosis;
temperature 20° C. to 22° C.;
osmosis membrane of the DOW BW30-400 type.

TABLE 1

|  | pH | Morpholine mg/L | $NH_4$ mg/L | $N_2H_4$ mg/L |
|---|---|---|---|---|
| Raw effluent | 9.2* | 645 | 200 | 0.1 |
| Osmosis permeate | 6.6 | 6.5 | 6.9 | <0.01 |
| Standards for release | 6.5-8.5 | 10 | 7 | 15 |

*Value on non-acidified effluent. The reverse osmosis test was performed on a sample acidified to pH = 6.3 using sulfuric acid.

The resulting hydraulic transformation rate was 5.

Furthermore, this osmosis treatment test, performed on effluent from cleaning a steam generator, which effluent carries a moderate load of conditioning chemicals so that the nitrogen compounds are reduced and that the release limits for the site are complied with.

Example 2

Application of the Reverse Osmosis to Treating Effluent from Chemically Cleaning a Steam Generator, which Effluent was Carrying Metals and Conditioning and Cleaning Chemicals (Morpholine, Hydrazine, Ammonia, and Amines)

The conditions of this test were as follows:
filtering pre-treatment with a cutoff threshold of 10 µm;
pH adjustment to 6.5 prior to reverse osmosis;
osmosis membrane of the DOW BW30-400 type.

TABLE 2

|  | pH | Conductivity mS/cm | Morpholine mg/L | $NH_4$ mg/L | $N_2H_4$ mg/L | NTK mg/L | Fe mg/L | Zn mg/L | Cu mg/L | EDA mg/L |
|---|---|---|---|---|---|---|---|---|---|---|
| Raw effluent | 9.9* | 9.2* | 546.1 | 2253 | 23.40 | 6300 | 17.6 | 126.1 | 462.3 | 10,416 |
| Osmosis concentrate | 6.3 | 89 | — | 7300 | — | 24,800 | 95 | 680 | 2090 | — |
| Osmosis permeate | 6.8 | 0.39 | <7.5 | 33.1 | <5 | 45 | <1 | <1 | 0.74 | — |
| Release standards | 6.5-8.5 | — | 10 | 7 | 15 | — | 5** | 5** | 5** | — |

*Value on non-acidified effluent. The reverse osmosis test was performed on a sample acidified to pH = 6.5 using sulfuric acid.
**Total metals release standard.

The resulting hydraulic transformation rate was 5.4.

The results given in Table 2 show satisfactory elimination of metals and nitrogen compounds, even though the initial concentration of nitrogen compounds and metals was high (up to several g/L).

In this example, the final concentration of ammonia remains above the release standard: nevertheless, finishing treatment by cationic ion exchange resin lowers this final concentration of ammonia, and also the concentration of nitrogen and morpholine (see Example 4 below).

Figure 2:
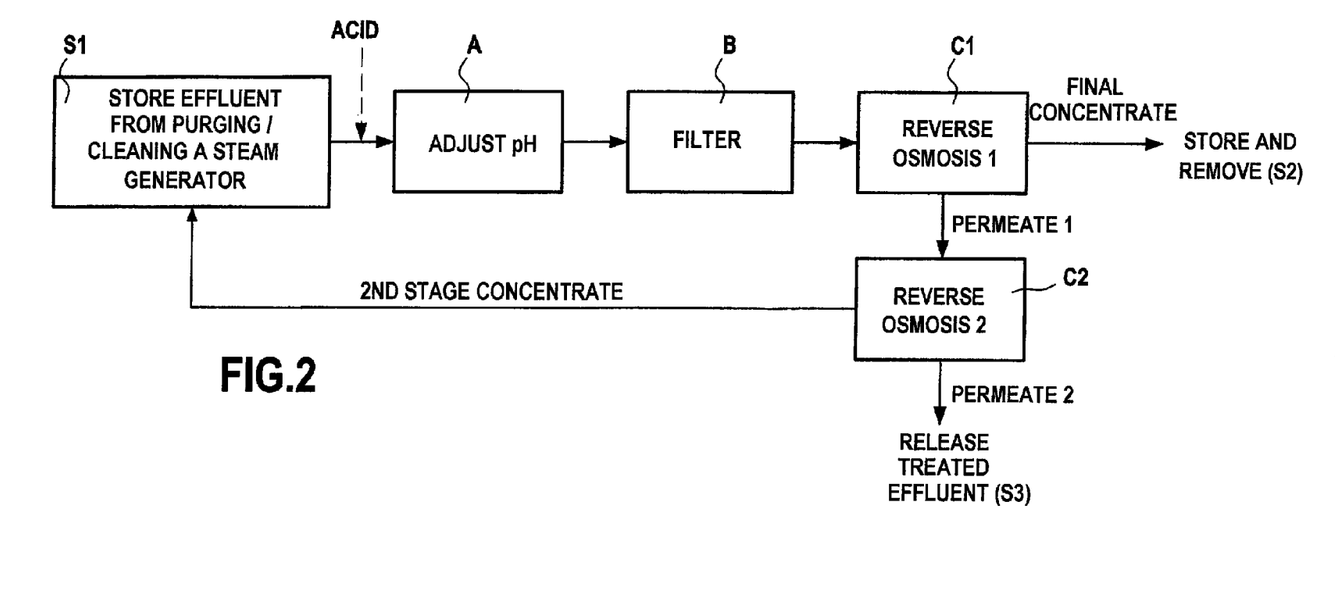
FIG. 2 shows a second treatment procedure in a second embodiment that does not implement the method of the invention.

In a second embodiment, a second treatment procedure is proposed as shown in FIG. 2, comprising a vessel S1 for storing water effluent from purging or cleaning steam generator circuits. From this vessel S1, the effluent is subjected to a step of adjusting its pH to a value in the range 5 to 6.5 (module A) and then to a filtering step (module B), and finally to a concentration step by double reverse osmosis treatment in two stages (modules C1 and C2).

At the outlet from the first reverse osmosis stage (module C1), the concentrate is stored in a vessel S2 prior to being removed and taken to a destruction center, while the permeate from the first reverse osmosis stage (module C1), at low concentration, is fed to the second reverse osmosis stage (module C2). At the outlet from the second reverse osmosis stage (module C2) the permeate, at low concentration, can be released (waste pipe or vessel S3), while the concentrate from the second stage, at high concentration, is returned to the vessel S1.

In this second procedure, two reverse osmosis stages (modules C1 and C2) are provided and they constitute the only treatment in the concentration step of the treatment method.

This relatively simple configuration is suitable in particular for treating effluent from chemically cleaning a steam generator, e.g. effluent having a very high load of nitrogen compounds that are not completely eliminated by a single stage of reverse osmosis, as is Example 2.

Figure 3:
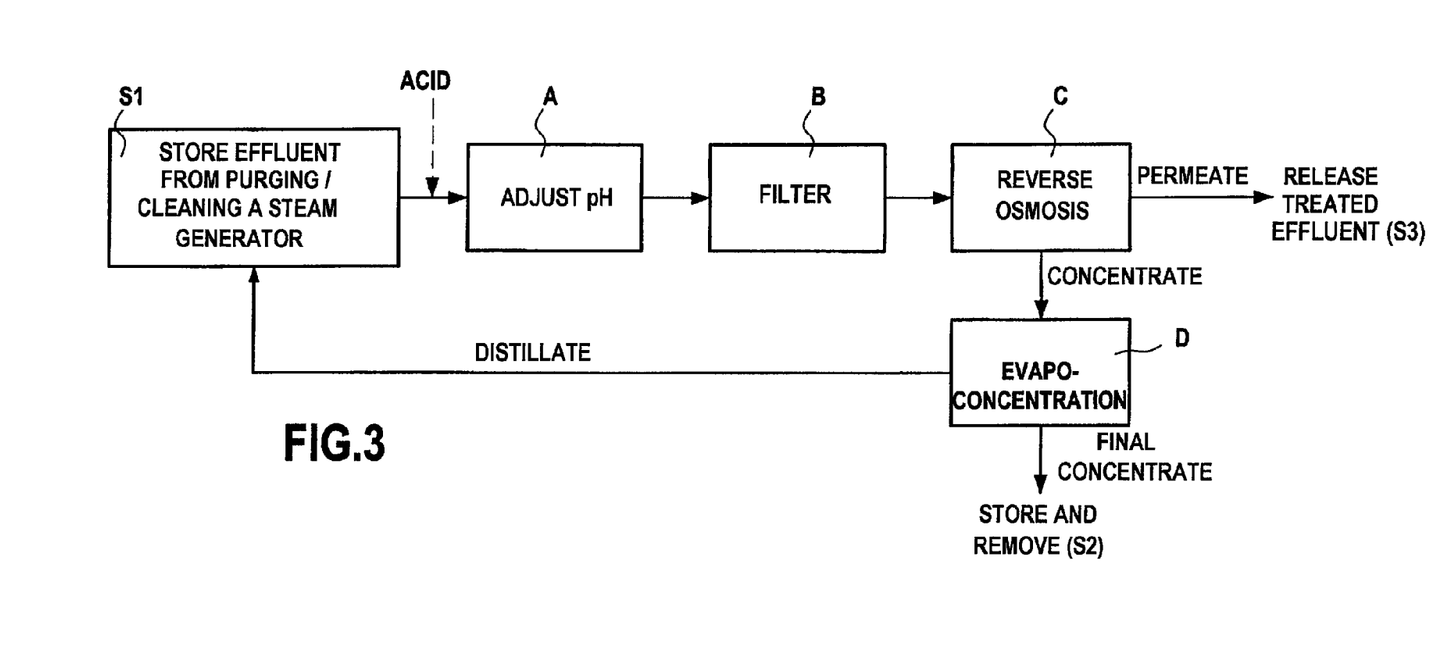
FIG. 3 shows a third treatment procedure in a third embodiment that implements the method of the invention.

In a third embodiment, implementing the method of the invention, a third treatment procedure is proposed as shown in FIG. 3, comprising a vessel S1 for storing water effluent from purging or cleaning steam generator circuits. From the vessel S1, the effluent is subjected to a step of adjusting its pH to a value in the range 5 to 6.5 (module A), and then to a filtering step (module B), and finally to a concentration step by means of reverse osmosis treatment (module C) followed by evapo-concentration treatment (module D).

At the outlet from the reverse osmosis stage (module C), the permeate, at low concentration, can be released (waste pipe or vessel S3), and the concentrate is fed to the evapo-concentration module D.

At the outlet from the evapo-concentration module D, the concentrate is stored in a vessel S2 prior to being removed and transported to a destruction center, while the evaporation distillate, which may still have a fairly high concentration of nitrogen compounds, is returned to the vessel S1 at the beginning of the treatment procedure.

In this third procedure, a reverse osmosis module and an evapo-concentration module are provided and they constitute the only two treatments in the concentration step of the treatment method.

This relatively simple configuration is suitable in particular for treating effluent from chemically cleaning a steam generator, which effluent carries a small to moderate load of nitrogen compounds, metals, and organic acids.

In order to minimize the energy consumption of this third treatment procedure, and also the volume of concentrate produced, the initial concentration step is performed by osmosis and the osmosis concentrate is superconcentrated by evapo-concentration up to the crystallization limit of the salts, i.e. a salt concentration that may be as great as 250 g/L to 350 g/L depending on the composition of the raw effluent.

Figure 4:
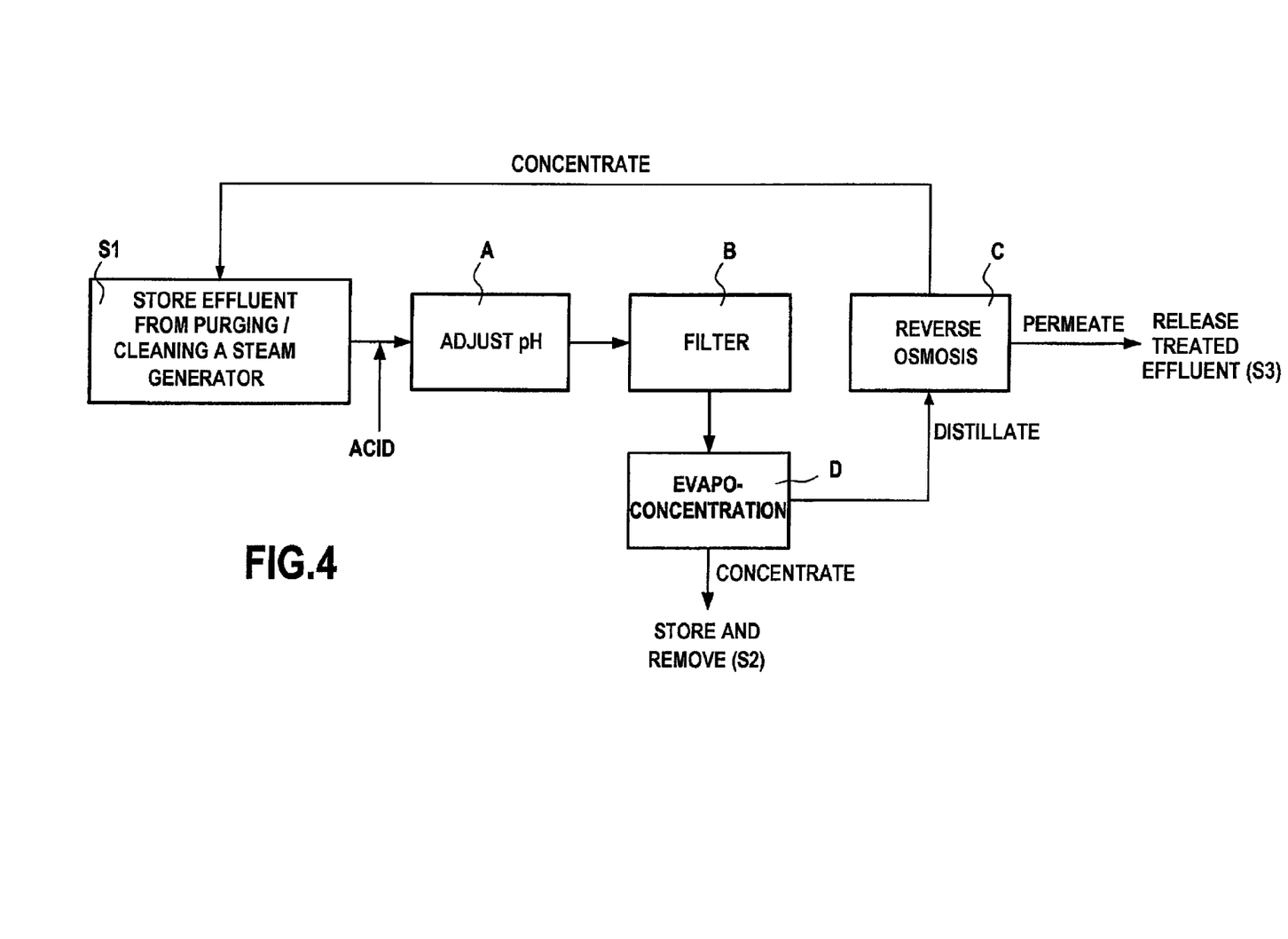
FIG. 4 shows a fourth treatment procedure in a fourth embodiment that implements the method of the invention.

In a variant, in a fourth embodiment implementing the method of the invention, a fourth treatment procedure is proposed as shown in FIG. 4. Here the evapo-concentration treatment is performed at the beginning of the treatment in the concentration step, and osmosis is positioned to treat the evaporation condensate as a finishing treatment to eliminate residual volatile compounds that are not retained by evapo-concentration.

This fourth treatment procedure shown in FIG. 4 comprises a vessel S1 for storing water effluent from purging or cleaning steam generator circuits. From the vessel S1, the effluent is subjected to a step of adjusting its pH to a value in the range 5 to 6.5 (module A), and then to a filtering step (module B), and finally to a concentration step by means of evapo-concentration treatment (module D) followed by osmosis treatment (module C).

At the outlet from the evapo-concentration module D, the concentrate is stored in a vessel S2 prior to being removed and transported to a destruction center, while the distillate, of low concentration, is sent to the reverse osmosis module C.

At the outlet from the reverse osmosis module C, the permeate, of low concentration, is suitable for being released (waste pipe or vessel S3) and the concentrate is returned to the vessel S1 at the beginning of the treatment procedure.

In this fourth procedure, both treatment by evapo-concentration and treatment by reverse osmosis are provided, and these are the only two treatments in the concentration step of the treatment method.

This relatively simple configuration is suitable in particular for treating effluent from chemically cleaning a steam generator, which effluent carries a heavy load of nitrogen compounds, metals, and organic acids.

Such a fourth procedure was implemented in particular in Example 3 described below.

Example 3

Application of Evapo-Concentration to Treating Effluent from Chemically Cleaning a Steam Generator of a Nuclear Power Station The conditions for this test were as follows:

filtering pre-treatment to a cutoff threshold of 10 μm;

pH adjustment to 5.0 prior to evapo-concentration (to obtain the best conditions for eliminating ammonia);

evapo-concentration module with forced recirculation and mechanical compression of steam (evaporation temperature of 90° C.); and highly concentrated effluent containing salinity close to 150 g/L and very high concentrations of EDTA, morpholine, ammonia, and metals.

TABLE 3

| | pH | EDTA mg/L | Morpholine mg/L | NH$_4$ mg/L | N$_2$H$_4$ mg/L | Fe mg/L | Zn mg/L | Ni mg/L | Mn mg/L | Cu mg/L |
|---|---|---|---|---|---|---|---|---|---|---|
| Raw effluent | 9.5* | 113,000 | 21,000 | 10,000 | 6 | 25,000 | 2080 | 450 | 170 | 30 |
| Evapo-concentration distillate for R = 70% | 8.4 | — | 510 | 0.6 | 0.05 | <1 | <1 | <1 | <1 | <1 |
| Permeate of osmosis on evapo-concentration distillate | 6.8 | — | <6.5 | <0.5 | <0.05 | <1 | <1 | <1 | <1 | <1 |
| Release standards | 6.5-8.5 | — | 10 | 7 | 15 | 5** | 5** | 5** | 5** | 5** |

*Value on non-acidified effluent. The evapo-concentration test was performed on a sample acidified to pH = 5-5.5, using sulfuric acid.
**Total metals release standard.

A maximum hydraulic concentration factor by volume (factor R) of 70% was obtained. The dry matter concentration of the concentrate was about 45% by weight. The results obtained in reducing nitrogen compounds and metals are satisfactory but the release limit is not satisfied for morpholine. Post-treatment of the evaporation distillate by reverse osmosis enables more than 98% of the residual morpholine to be eliminated, thereby complying with the release standard of the site, set at 10 mg/L, to be complied with.

Figure 5:
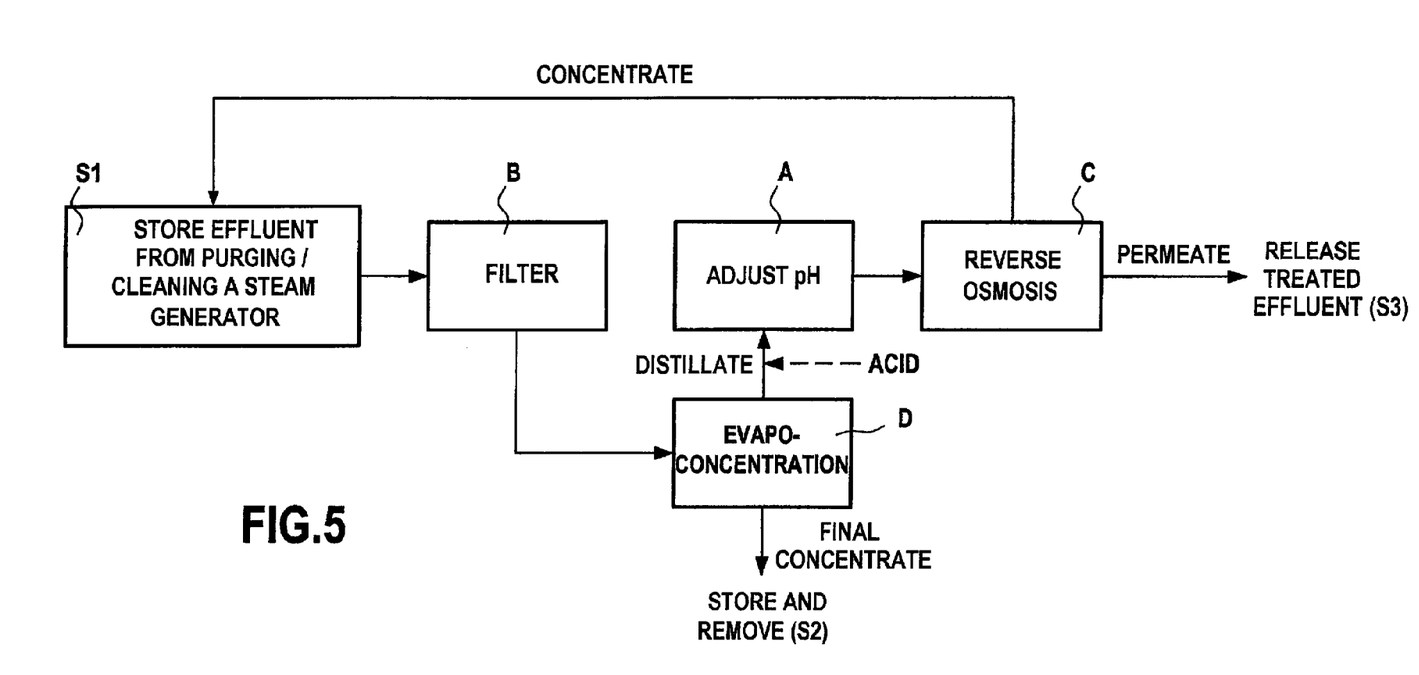
FIG. 5 shows a fifth treatment procedure in a fifth embodiment that implements the method of the invention.

In the fifth treatment procedure shown in FIG. 5 and enabling the method of the invention to be implemented, the pH adjustment step (module A) is performed after evapo-concentration treatment (module D).

Thus, in this fifth proposed treatment procedure, the only difference compared with the above-described fourth procedure amounts to not performing the pH adjustment step A upstream from the filter step (module B), and upstream from the evapo-concentration treatment (module D), but instead downstream from the evapo-concentration treatment (module D). It will be understood that this modification nevertheless still places this pH adjustment step upstream from the reverse osmosis treatment performed by the module C.

To achieve very low final concentrations in the treated effluent (lower than 10 mg/L), when the raw effluent contains high concentrations of pollutant (i.e. g/L of morpholine, amines, hydrazine, EDTA, metals), the present invention proposes adding a refining step on ion exchange resin that finishes off the concentration step of the effluent treatment method by having recourse to an additional module E with ion exchange resin.

Such a treatment method associated with final concentration treatment in the form of refining on ion exchange resin corresponds to the sixth, seventh, eighth, and ninth treatment procedures as shown respectively in FIGS. 6 to 9.

These sixth, seventh, eighth, and ninth treatment procedures of FIGS. 6 to 9 differ from the first, third, fourth, and fifth treatment procedures of FIGS. 1 and 3 to 5 respectively in that an ion exchange resin treatment module E is placed as additional treatment and last treatment for the concentration step.

This module E for treatment by ion exchange resin is fed with regeneration solution and at its outlet, the eluate is returned to the vessel S1, at the beginning of the treatment procedure, while the treated effluent, of low concentration, can be released (waste pipe or vessel S3).

Figure 6:
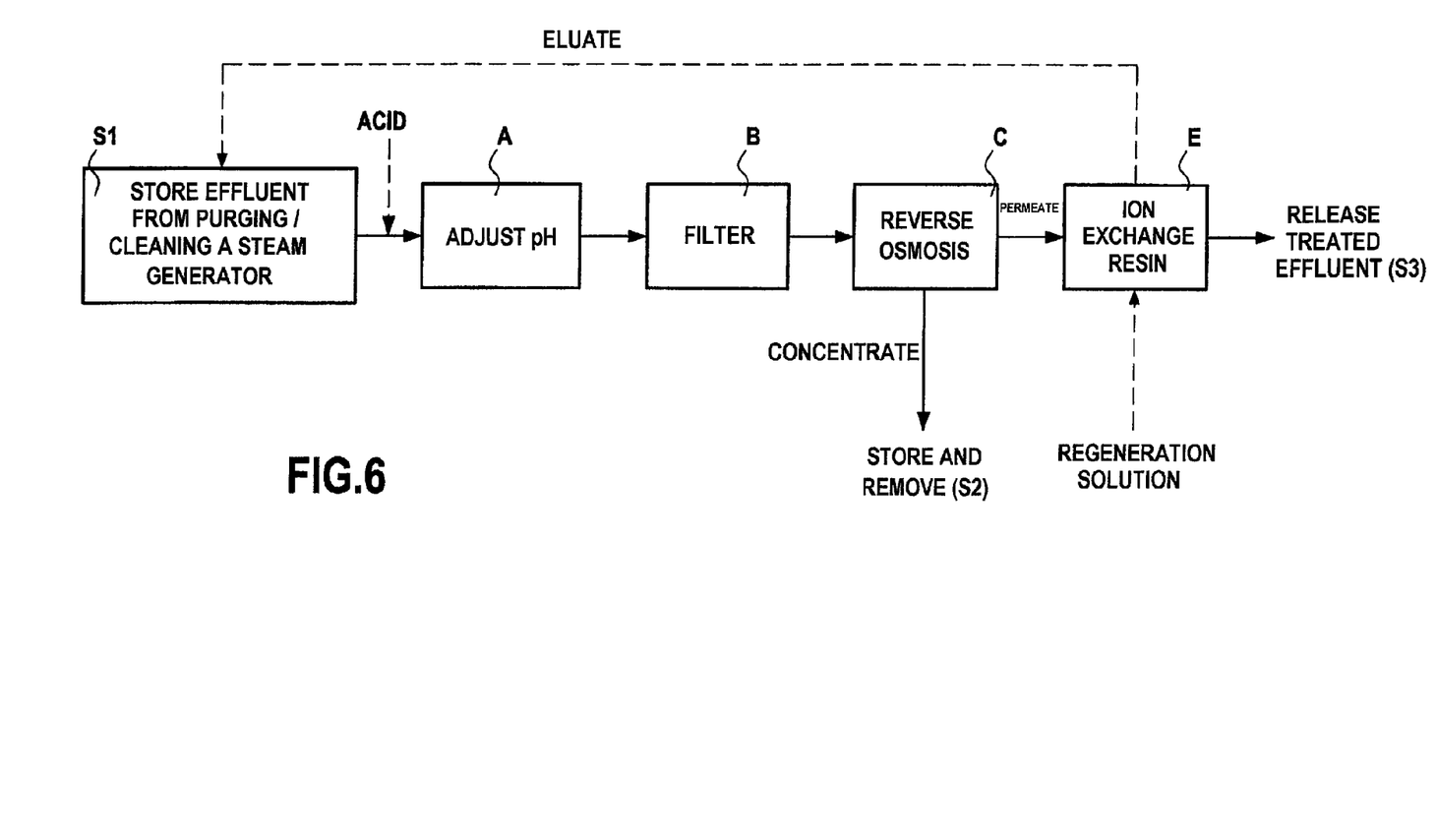
FIG. 6 shows a sixth treatment procedure in a sixth embodiment that does not implement the method of the invention.

Thus, in the sixth treatment procedure of FIG. 6, the module E for treatment by ion exchange resin is placed downstream for the module C for reverse osmosis treatment and it is fed with the permeate from the module C.

In this sixth treatment procedure of FIG. 6, the concentration step is performed solely by reverse osmosis treatment and by ion exchange resin treatment, said ion exchange resin treatment being performed downstream from the reverse osmosis treatment. Thus, in this procedure, there is no evapo-concentration treatment.

Figure 7:
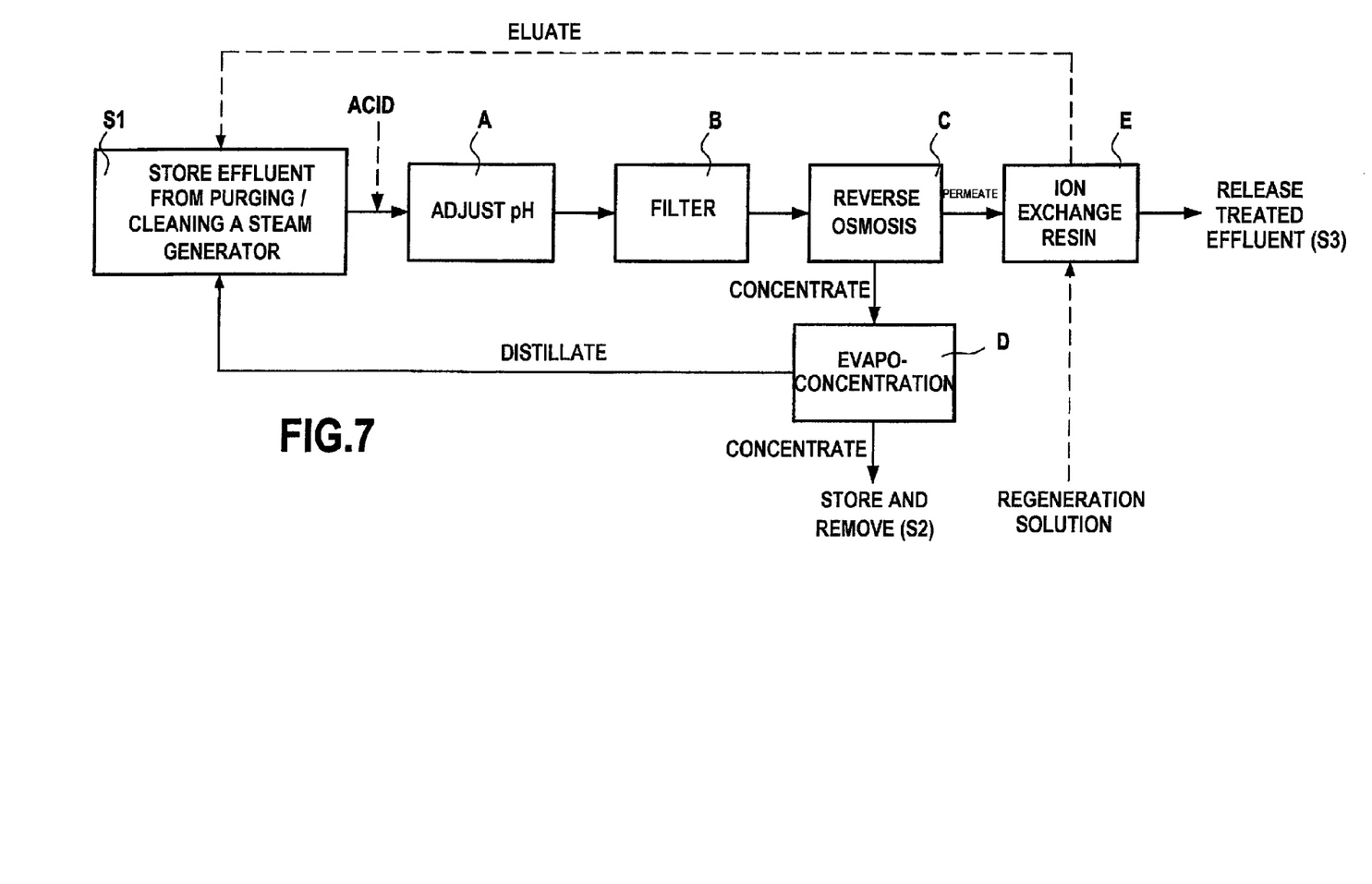
FIG. 7 shows a seventh treatment procedure in a seventh embodiment that implements the method of the invention.

In the seventh treatment procedure of FIG. 7, the module E for ion exchange resin treatment is placed downstream from the reverse osmosis treatment module C and it is fed with the permeate from the module C, the evapo-concentration module D remaining placed downstream from the reverse osmosis module C and being fed with the concentrate from the module C.

Figure 8:
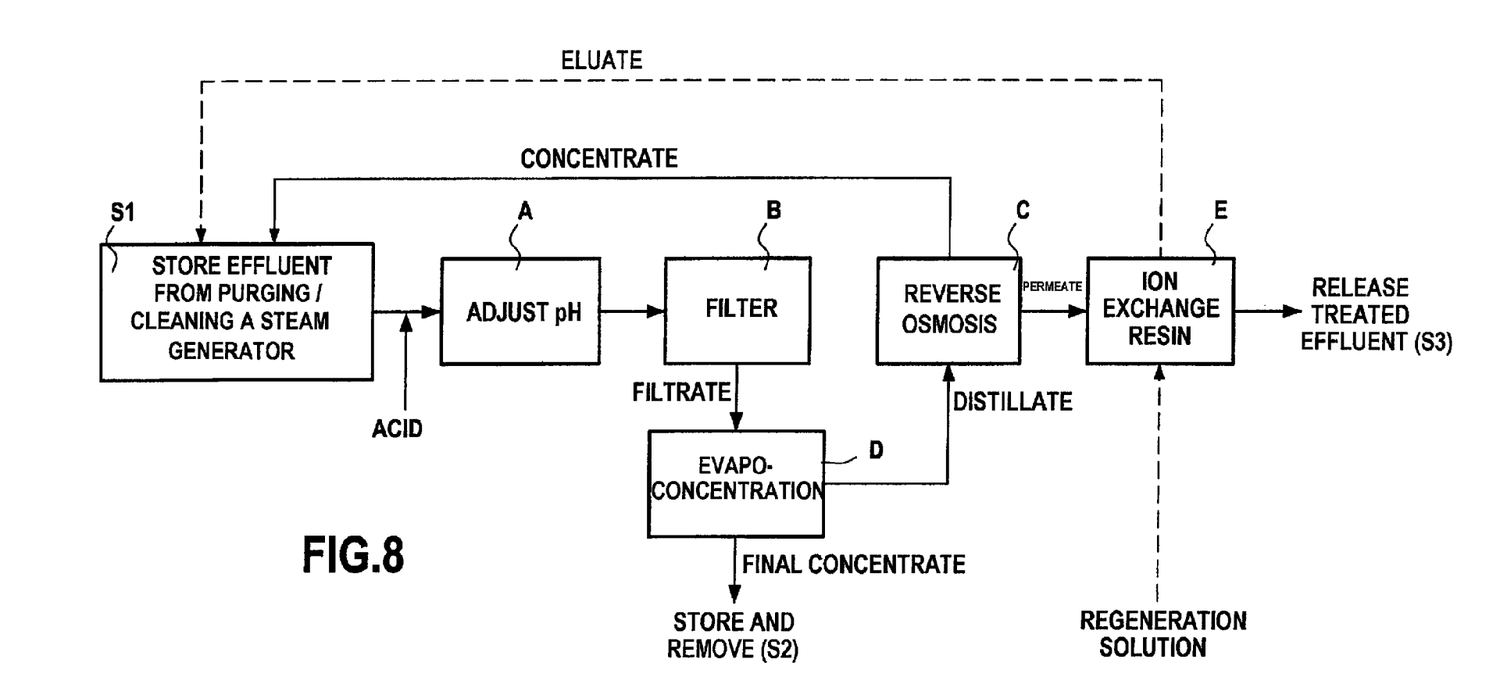
FIG. 8 shows an eighth treatment procedure in an eighth embodiment that implements the method of the invention.
Figure 9:
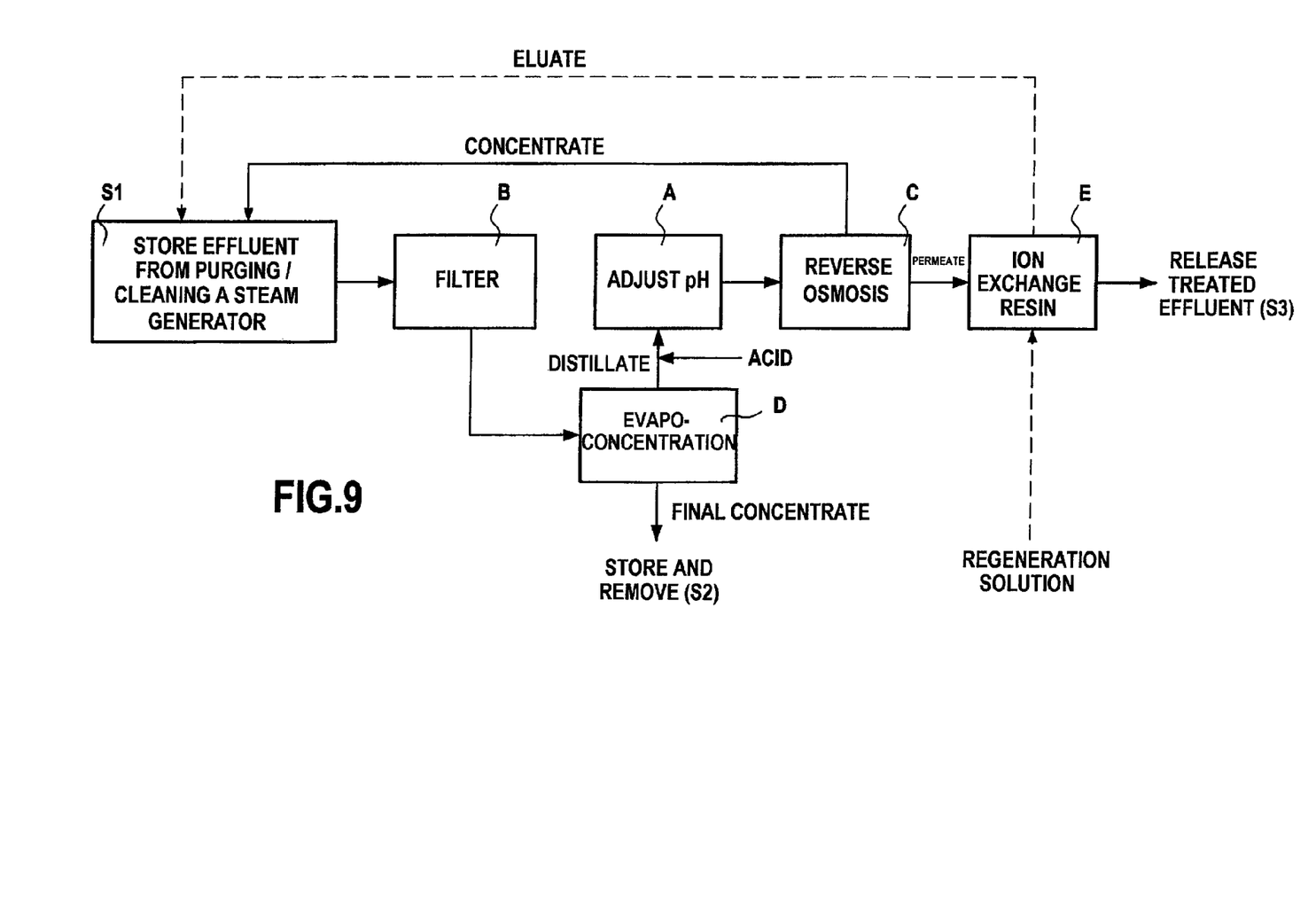
FIG. 9 shows a ninth treatment procedure in a ninth embodiment that implements the method of the invention.

In the eighth treatment procedure of FIG. 8 and the ninth treatment procedure of FIG. 9, the ion exchange resin treatment module E is placed downstream from the reverse osmosis treatment module C and is fed with the permeate from the module C.

In the sixth, seventh, eighth, and ninth treatment procedures of FIGS. 6 to 9, the regeneration brine (or eluate) from the ion exchange resin module E is returned to the beginning of the treatment procedure (vessel S1) together with the raw effluent, while the treated effluent, of low concentration, is suitable for being released (waste pipe or vessel S3).

In these sixth, seventh, eighth, and ninth treatment procedures of FIGS. 6 to 9, it should be observed that the sixth treatment procedure of FIG. 6 constitutes an inexpensive configuration comprising pH adjustment, then osmosis, and refining on ion exchange resin. This configuration is particularly suitable for effluents of low concentration to medium concentration (0.1 g/L to 10 g/L of pollutants, for example), since this sixth treatment procedure enables an advantageous concentration factor to be achieved without implementing an evapo-concentration step.

Figure 10:
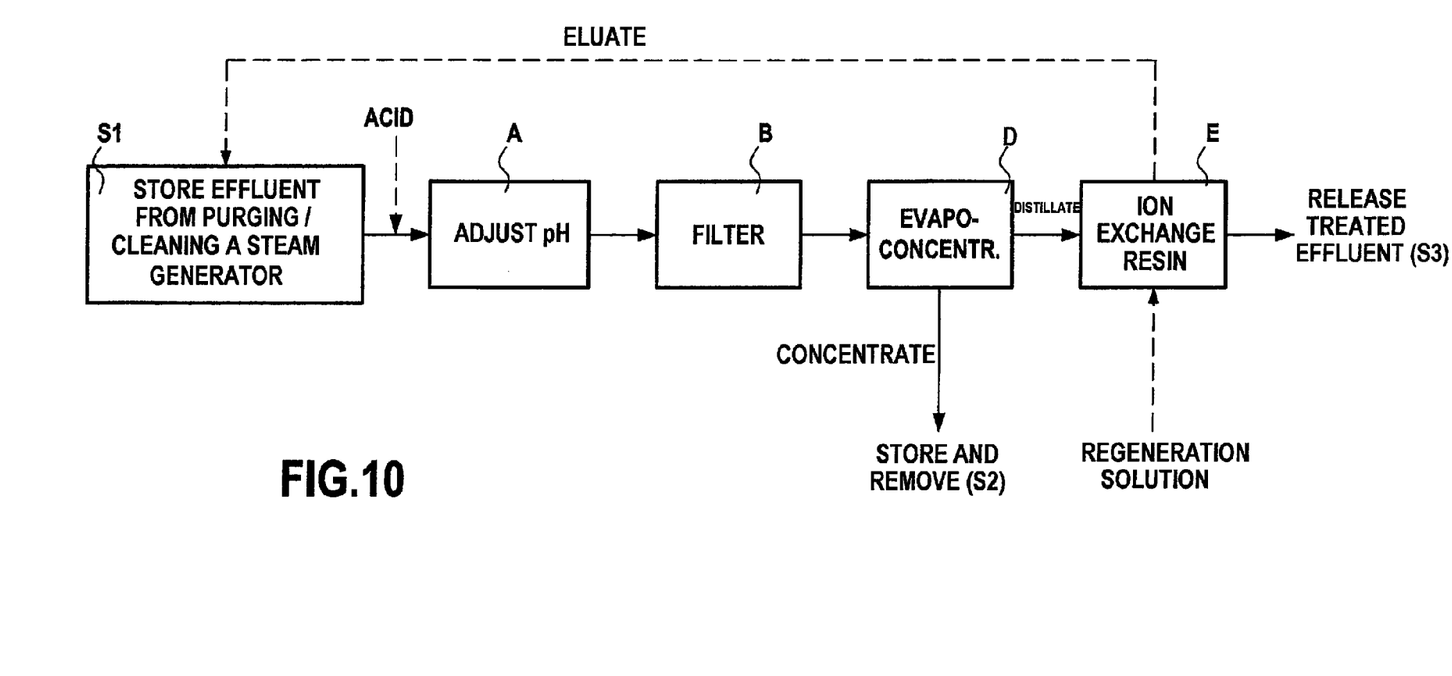
FIG. 10 shows a tenth treatment procedure in a tenth embodiment that does not implement the method of the invention.

In another embodiment implementing the method of the invention, a tenth treatment procedure is proposed as shown in FIG. 10, comprising a vessel S1 for storing water effluent from purging or cleaning steam generator circuits. From the vessel S1, the effluent is subjected to a step of adjusting its pH to a value in the range 5 to 6.5 (module A), and then to a filtering step (module B), and finally to a step of concentration by means of evapo-concentration treatment (module D) followed by ion exchange resin treatment (module E). At the end of the evapo-concentration treatment, the concentrate is stored in a vessel S2 prior to being removed and transported to a destruction center, while the distillate is delivered to the ion exchange treatment module E.

The ion exchange resin treatment module E is fed with regeneration solution. At the outlet from the ion exchange resin treatment module E, the eluate from the ion exchange resin module E is returned to the beginning of the treatment procedure (vessel S1) together with the raw effluent, while the treated effluent, of low concentration, is suitable for being released (waste pipe or vessel S3).

In this tenth treatment procedure, the raw effluent concentration step is performed by the evapo-concentration treatment (module D), and by the ion exchange resin treatment (module E), said ion exchange resin treatment being performed on the distillate of the evapo-concentration treatment, i.e. downstream from the evapo-concentration treatment.

This configuration constituting the tenth treatment procedure that has only two treatment stages is particularly suitable for very high concentrations of pollutants (more than a few g/L), as can be seen from Example 4 below.

Example 4

Application of Evapo-Concentration to Treating Effluent from Chemically Cleaning a Steam Generator with a Final Step of Refining on Cationic Ion Exchange Resin The conditions for this test were as follows:
filtering pre-treatment with a cutoff threshold of 10 μm; and
pH adjustment to 6-6.5 prior to evapo-concentration.

TABLE 4

|  | pH | Morpholine mg/L | $NH_4$ mg/L | $N_2H_4$ mg/L |
|---|---|---|---|---|
| Raw effluent | 9.5* | 9100 | 200 | 6.5 |
| Treated effluent (distillate) at evapo-concentration outlet | 8.8 | 35 | 86 | 0.08 |
| Effluent after final treatment on ion exchange resin | — | 1.1 | <1 | <0.1 |
| Release standards | 6.5-8.5 | 10 | 7 | 15 |

*Value on non-acidified effluent.

The applied hydraulic concentration factor (R) was 60%.

For low residual concentrations of ammonia and morpholine (e.g. less than 100 mg/L), in the distillate after evaporation treatment, refining treatment on ion exchange resin is less expensive than treatment by reverse osmosis. Table 4 shows that final refining treatment on an ion exchange resin filter placed to treat the evapo-concentration distillate makes it possible to comply with the site release standards concerning nitrogen compounds, even though evapo-concentration on its own does not make this possible.

Figure 11:
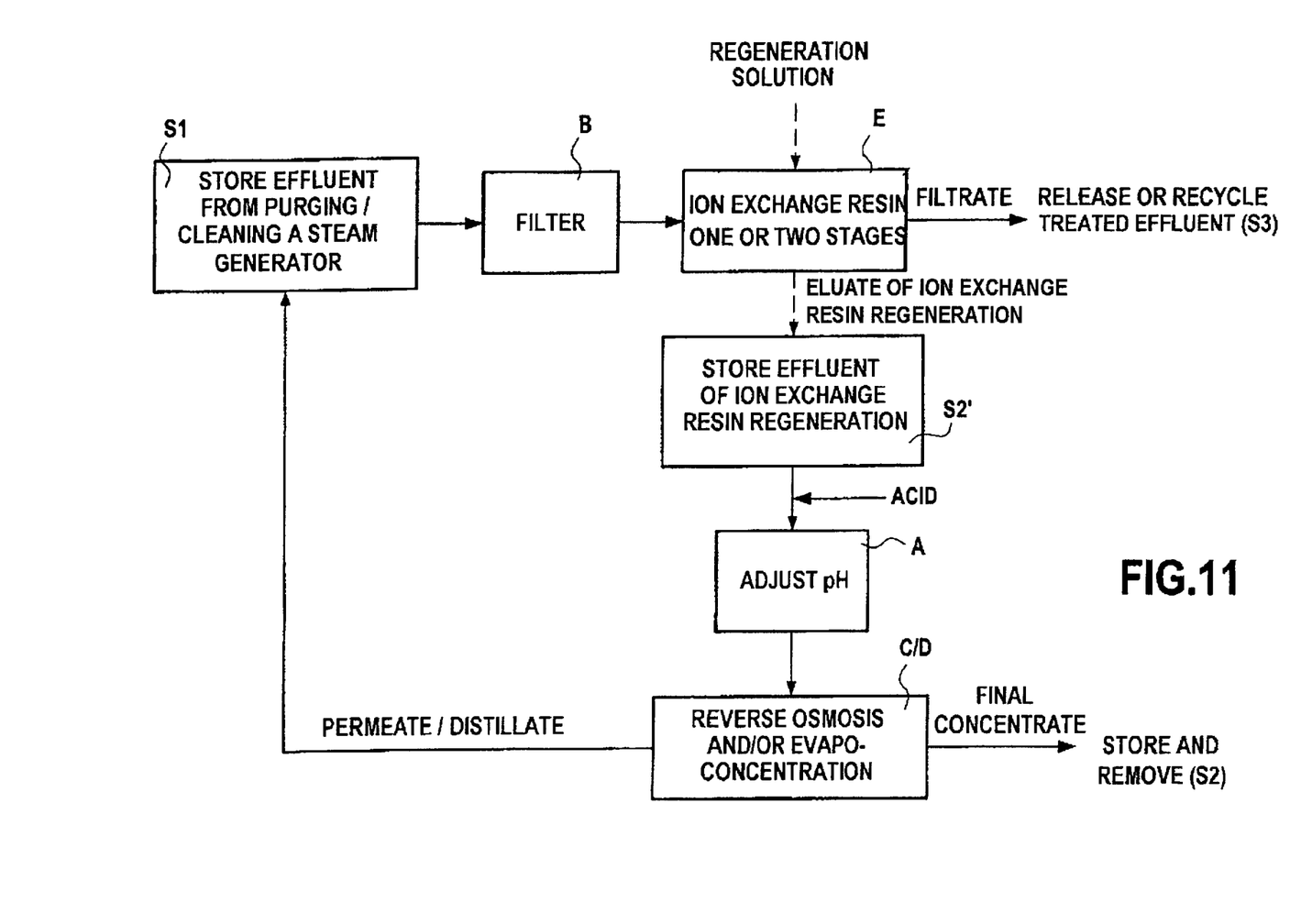
FIG. 11 shows an eleventh treatment procedure in an eleventh embodiment that implements the method of the invention.

Reference is now made to FIG. 11 which shows an eleventh treatment procedure that is particularly suitable for treating effluent of very low concentration (concentration below 0.1 g/L).

In this procedure, the concentration step also includes prior treatment by ion exchange resin that is implemented before any other treatment of the concentration step. Under such circumstances, it will be understood that the concentration step comprises a first substep of pre-concentration by ion exchange resin.

This eleventh treatment procedure shown in FIG. 11 comprises a vessel S1 for storing water effluent from purging or cleaning steam generator circuits. From this second vessel S1, the effluent is subjected to a filtering step (module B), and then to first treatment of the concentration step by means of an ion exchange resin module E that is fed with regeneration solution.

At the outlet from the module E, the filtrate at low concentration is suitable for being released (waste pipe or vessel S3), and the eluate is delivered to a vessel S2' for storing the regeneration effluent of the ion exchange resin.

Thereafter, said ion exchange resin regeneration effluent is subjected from the vessel S2' to a step of adjusting its pH to a value in the range 5 to 6.5 (module A), and finally to a second treatment of the concentration step by means of evapo-concentration treatment (module D) or osmosis treatment (module C). At the outlet from this second treatment of the concentration step, the final concentrate is stored in a vessel S2 prior to being removed and transported to a destruction center, while the permeate or distillate is returned to the beginning of the treatment procedure (vessel S1) together with the raw effluent if its concentration of pollutant is still too high (in particular of nitrogen compounds); otherwise it may be directed to the vessel S3, i.e. for release, or indeed it may be recycled.

Thus, the concentration step of the eleventh treatment procedure comprises first treatment on ion exchange resin (module E) (a cationic stage or a mixed bed or a cationic stage plus an anionic stage) and then the regeneration effluent is concentrated by at least a second treatment that consists either in reverse osmosis treatment (module C), or in evapo-concentration treatment (module D), or treatment both by reverse osmosis and by evapo-concentration (modules C and D), or by one of the procedures described above with reference to any one of FIGS. 1 to 10.

Figure 12:
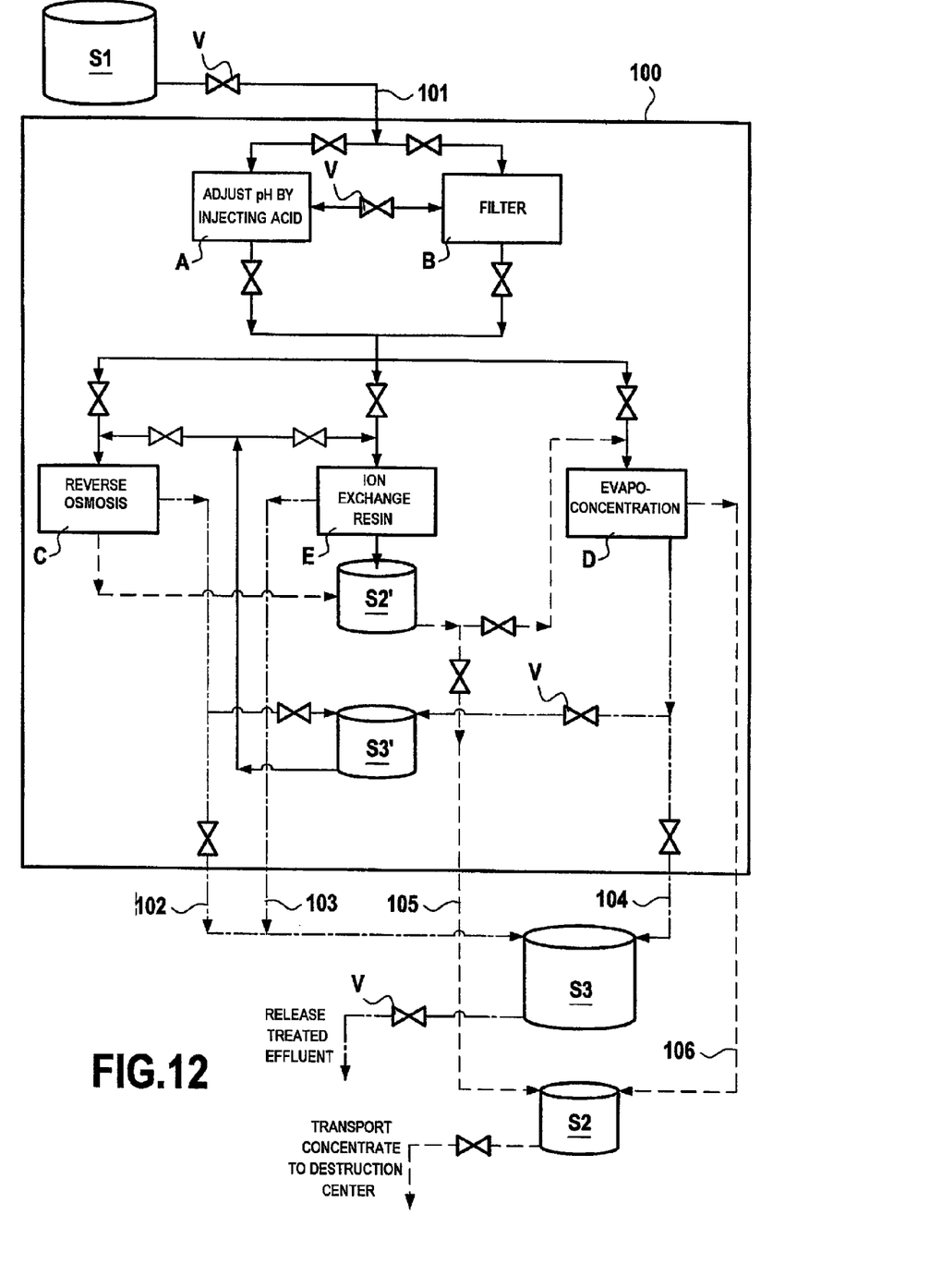
FIG. 12 is a diagram of a mobile unit enabling the method of the invention to be implemented.

Reference is now made to FIG. 12 which is a diagram showing a mobile unit 100 suitable for implementing the method of the invention.

Such a mobile unit 100 enables the various assemblies of unit steps in the first to eleventh embodiments as described above to be implemented, and it is installed either permanently close to steam generators that produce the effluent for treatment, or else on a movable frame (a trailer or a container) that can be moved to treat effluent from steam generators on different sites, or at a specialized treatment site to which the effluent for treatment is taken.

In its most complete configuration, the mobile unit 100 comprises a safety screening/filtering module B together with the other modules for the individual steps of the above-described treatment procedures: the module A for adjusting pH with acid, the reverse osmosis module C (having one or more stages), the evapo-concentration module D, and the ion exchange resin module E.

Under all circumstances, the raw effluent is subjected to first filtering treatment to eliminate matter in suspension, and then, depending on its pollutant concentration, it is delivered to at least one of the modules D and E for performing the concentration step treatment, and it passes via the module A for adjusting pH.

The raw effluent is preferably subjected to a concentration step by passing through at least two of the three modules C, D, and E (reverse osmosis, evapo-concentration, and ion exchange resin).

In order to implement all of the various possible procedures of the treatment method, the inlet and the outlet to each of the four modules A, C, D, and E are connected to the pre-filtering module B and they are connected to one another by pipes forming a hydraulic connection.

The mobile unit 100 also has an intermediate storage vessel S2' for storing concentrate, which vessel is rotated downstream from the modules C and E, together with an intermediate storage vessel S3' for treated effluent located downstream from the modules C, D, and E.

An inlet duct 101 connects the mobile unit 100 to the vessel S1 for storing raw effluent, outlet ducts 102, 103, and 104 connect the outlets of the modules C, D, and E to a treated effluent storage vessel S3. In addition, outlet ducts 105 and 106 connect the intermediate storage vessel S2' for storing concentrates and the evapo-concentration module D respectively to a concentrate storage vessel S2.

Each pipe and each duct may be opened or closed by a valve V.

By way of example, the filtering to be performed in the filter module B may go from a simple screen having a mesh size of 100 µm to 150 µm to protect the evapo-concentration module D, to 20 µm-50 µm bag filters for protecting the osmosis module C, or indeed a cartridge filter (in particular having a mean cutoff threshold of 10 µm), or possibly even granular filtering equipment (sand filter or multimedia filter with cutoff thresholds typically in the range 2 µm to 10 µm), or microfiltration pipe membrane filter equipment (cutoff threshold in the range 0.1 µm to 0.5 µm) or indeed ultrafiltration equipment (cutoff threshold of the order of 0.01 µm to 0.05 µm).

The module B for adjusting the pH of the effluent may make use in particular of sulfuric acid, hydrochloric acid, and nitric acid.

In a variant that can be used optionally in all of the above-described implementations of the effluent treatment method, the following additional step is performed: the liquid concentrate is dried so as to form a dry concentrate. This amounts to performing evapo-crystallization as is appropriate when the destruction center operates by incineration.

What is claimed is:

1. A method for treating a steam generator circuit purging or cleaning effluent, the method comprising:
    providing effluent from a purging or cleaning operation of the steam generator circuit, wherein the effluent has a pH of 7.0 or above and wherein the effluent contains suspended solids, organic acids, metals, and nitrogen-containing compounds;
    lowering the pH of the effluent to between approximately 5 and approximately 6.5 such that the organic acids, the nitrogen-containing compounds, and metals are dissolved within the effluent;
    removing suspended solids from the effluent;
    concentrating the effluent in a reverse osmosis unit and in an evaporator-concentrator so as to produce a treated effluent; and
    wherein concentrating the effluent removes at least 98% of the organic acids, metals, and nitrogen-containing compounds contained in the steam generator circuit purging or cleaning effluent.

2. The method of claim 1 wherein concentrating the effluent further includes:
    concentrating the effluent in the evaporator-concentrator to form a distillate and a first concentrate stream;
    concentrating the distillate from the evaporator-concentrator in the reverse osmosis unit to form a permeate and a second concentrate stream; and
    wherein the permeate from the reverse osmosis unit forms the treated effluent.

3. The method of claim 2 further comprising mixing the first concentrate stream with the effluent provided from the purging or cleaning operation of the steam generator circuit.

4. The method of claim 1 wherein the effluent is concentrated in the evaporator-concentrator prior to being concentrated in the reverse osmosis unit and wherein the pH of the effluent is lowered after the effluent is concentrated in the evaporator-concentrator and prior to being concentrated in the reverse osmosis unit.

5. The method of claim 1 wherein concentrating the effluent in the reverse osmosis unit forms a concentrate and the treated effluent and wherein the concentrate is mixed with the effluent provided from the purging or cleaning operation of the steam generator circuit.

6. A method of treating a steam generator cleaning effluent having a pH greater than 6.5 and containing suspended solids, organic acids, metals and nitrogen-containing compounds, the method comprising:
    storing the steam generator cleaning effluent in a storage facility;
    directing the steam generator cleaning effluent from the storage facility to a filter and filtering suspended solids from the steam generator cleaning effluent;
    adjusting the pH of the steam generator cleaning effluent by lowering the pH of the effluent to between approximately 5 and approximately 6.5 such that the organic acid, metals and nitrogen-containing compounds are dissolved within the steam generator cleaning effluent;
    after filtering the steam generator cleaning effluent directing the steam generator cleaning effluent to an evaporator and concentrating the steam generator cleaning effluent to form a distillate and a first concentrate stream; and
    directing the distillate from the evaporator to a reverse osmosis unit and concentrating the distillate to form a second concentrate stream and a permeate, and wherein the permeate from the reverse osmosis unit constitutes a treated effluent and wherein a substantial portion of the organic acids, metals and nitrogen-containing compounds in the steam generator cleaning effluent is removed via the first or second concentrate streams.

7. The method of claim 6 including recycling the second concentrate stream from the reverse osmosis unit and treating the second concentrate stream by filtering and subjecting the second concentrate stream to treatment by the evaporator and reverse osmosis unit.

8. The method of claim 6 wherein the method removes at least 98% of the organic acids, metals and nitrogen-containing compounds contained in the steam generator cleaning effluent.

9. The method of claim 6 wherein lowering the pH of the steam generator cleaning effluent includes adding a reagent to the distillate produced by the evaporator prior to the distillate reaching the reverse osmosis unit.

* * * * *